:::: {.columns}
::: {.column}
(12) United States Patent
Dwekat et al.

(54) EARLY DETECTION OF FAULTY COMMUNICATIONS LINKS

(75) Inventors: Zyad Dwekat, Raleigh, NC (US); Steven P. Divens, Wake Forest, NC (US); Jerry Odum, Zebulon, NC (US); Donald B. Drye, Raleigh, NC (US); Darryl Haley, Zebulon, NC (US)

(73) Assignee: Embarq Holdings Company, LLC, Overland Park, KS (US)

( * ) Notice: Subject to any disclaimer, the term of this patent is extended or adjusted under 35 U.S.C. 154(b) by 717 days.

(21) Appl. No.: 11/271,724

(22) Filed: Nov. 9, 2005

(51) Int. Cl.
*H04J 3/14* (2006.01)
*H04L 12/26* (2006.01)

(52) U.S. Cl. .................................... 370/241

(58) Field of Classification Search ......... 370/241–245, 370/252, 253
See application file for complete search history.

(56) References Cited

U.S. PATENT DOCUMENTS 5,231,649 A * 7/1993 Duncanson ................. 375/260
5,884,037 A * 3/1999 Aras et al. .................. 709/226
5,940,373 A * 8/1999 Chiu et al. .................. 370/238
:::

::: {.column}
(10) Patent No.: US 7,643,428 B1
(45) Date of Patent: Jan. 5, 2010

5,987,442 A * 11/1999 Lewis et al. ................... 706/10
6,016,503 A * 1/2000 Overby et al. ................ 718/104
6,058,260 A * 5/2000 Brockel et al. ................. 703/4
6,370,573 B1 * 4/2002 Bowman-Amuah ......... 709/223
6,725,263 B1 * 4/2004 Torres ......................... 709/223
6,748,000 B1 * 6/2004 Vainikainen et al. ........ 370/517
2002/0087116 A1 * 7/2002 Hartlaub ....................... 604/65
2003/0002489 A1 * 1/2003 Bulick et al. ................ 370/354
2004/0214583 A1 * 10/2004 Graham et al. .............. 455/453
2005/0137835 A1 * 6/2005 Moessner ................... 702/193
2006/0069629 A1 * 3/2006 Schweitzer et al. .......... 705/28
2007/0010900 A1 * 1/2007 Kavaklioglu et al. ......... 700/26
2007/0081543 A1 * 4/2007 Brenes et al. ............... 370/401

\* cited by examiner

*Primary Examiner*—Min Jung
(74) *Attorney, Agent, or Firm*—Sonnenschein Nath & Rosenthal LLP

(57) ABSTRACT

A method, and graphical user interface are provided for monitoring the status and forecasting the exhaust date of communications links. Initially, data ports are monitored corresponding to one or more communications links over a period of time. Next, utilization statistics are polled and stored in a database. Thereafter, an average and a rate of change are calculated using the utilization statistics. Based on these calculations, a date of exhaustion can be forecasted. The user interface further provides a user the ability to monitor the status and select multiple communications links to ensure data is flowing properly.

20 Claims, 3 Drawing Sheets
:::
::::

EARLY DETECTION OF FAULTY COMMUNICATIONS LINKS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Communicating data is important to everyday life. Many companies rely on the flow of data between businesses in commercial transactions. Likewise, consumers use communications lines to send all types of data for personal or business uses. If a communications line is down, serious consequences can take place. For example, proprietary information may be lost, commercial transactions may not occur, emergency services may be made unavailable, etc. Additionally, the cost for failure of such data communication is enormous to businesses and consumers. Early detection of a failed communications line can reduce lost resources and downtime.

For example, consider a $35,000 communications link placed between two locations (e.g. Point A and Point B) for a business that pays $35,000 per month to operate it. If the bandwidth of the communications link is exhausted, then it will have to be replaced if additional data is to be communicated. As a result, if the exhaustion date of the communications link is not detected early, then business will have no choice but to take immediate and often expensive action to help remedy the problem. This becomes extremely costly because in addition to buying a new communications link, the business may have to pay, for example, for a SONET transport for the communications link and buy an interlaying infrastructure. This can cost the business hundreds of thousands of dollars. As such, the business would likely pass on such costs to its consumers by raising the fees to transmit data from Point A to Point B.

Furthermore, data-transmission services will run comparatively slower until the communications-link issue is resolved. Typically, a replacement communications link can take anywhere from six to nine months to arrive. If a business could more accurately forecast the date of exhaustion for a communications link, then a replacement communications link could properly be ordered, installation and other time considerations could be given their due consideration, and service interruptions could be minimized.

The current state of the art could be improved by providing, among other things, a method and graphical user interface (GUI) to monitor the status of and forecast an exhaustion date of communications links.

SUMMARY

Embodiments of the present invention solve at least the above problems by providing a user interface and method for, among other things, monitoring the status and forecasting the exhaust date of communications links. The present invention has several practical applications in the technical arts including early detection of faulty communications links and ensuring proper data flow; providing an accurate reading of the status of the communications links and an early detection for communications links failure; ensuring that data flows properly and at the appropriate bandwidth capacity; providing a quick and concise way to navigate through characteristics of multiple communications links; and providing a display and depiction tool for viewing utilization statistics associated with various communications links.

In a first aspect, a method is provided for replacing a faulty communications link. The method includes providing a set of computer-usable instructions for referencing one or more communications links for utilization statistics over a period of time, providing a database for storing and retrieving utilization statistics of the communications links, and providing a set of computer-usable instructions for calculating an average and a rate of change of the utilization statistics using a trimmed set of data and calculating a date of exhaustion for a communications link.

In another aspect, a system is provided for forecasting a date of exhaustion for a communications link. The system includes a set of computer-usable instructions for monitoring a data port corresponding to one or more communications links over a period of time, polling utilization statistics corresponding to the communications links at a specified time interval, identifying a current exhaust threshold value of a communications link, calculating an average and an average rate of growth using the utilization statistics, and comparing the current exhaust threshold value of a communications link with the calculated average and the calculated average rate of growth and based on these comparison results forecasting an expected date of exhaustion for the communications link.

In still another aspect, a graphical user interface (GUI) is provided for displaying a status of a communications link. The GUI provides menu items corresponding to characteristics of communications links, a graphing tool that depicts utilization statistics for forecasting an exhaust date of communications links, and a communications-link listing grid having communications links that are sortable by a set of parameter values for monitoring the status and forecasting the exhaust date of the communications links.

BRIEF DESCRIPTION OF THE SEVERAL VIEWS OF THE DRAWINGS

The present invention is described in detail below with reference to the attached drawing figures, which are incorporated by reference herein and wherein.

DETAILED DESCRIPTION

Figure 1:
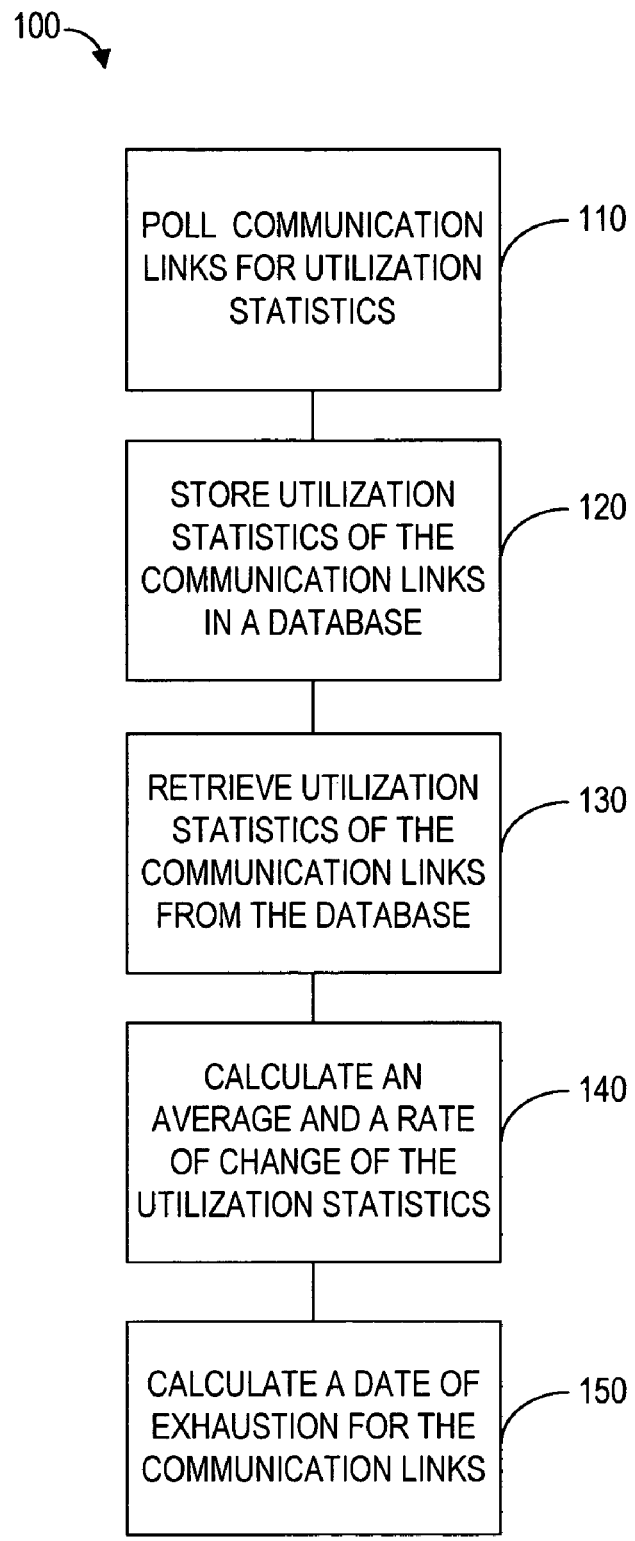
FIG. 1 is a flowchart illustrating an first overview of a method in accordance with an embodiment of the invention.

The present invention is defined by the claims below. Embodiments provide, among other things, a method and a user interface for forecasting the exhaustion date of a communications link and monitoring the status communications link. A reliable and accurate way is disclosed to ensure that data is flowing properly by forecasting the exhaustion date of a communications link.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| ANS | Advanced Networking Services |
| CDC | Central Database Collection |
| CLLI | Common Language Location Identification |
| GUI | Graphical User Interface |

Further, various technical terms are used throughout this description. A definition of such terms can be found in *Newton's Telecom Dictionary* by H. Newton, $21^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, the present invention may be embodied as, among other things: a method, system, or computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on one or more computer-readable media.

Computer-readable media include both volatile and non-volatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread spectrum, and other wireless media technologies. Combinations of the above are included within the scope of computer-readable media.

FIG. 1 provides an example of a method for replacing a faulty communications link 100. In FIG. 1, a set of computer-useable instructions references communications links at a step 10 for utilization statistics. In one embodiment, the utilization statistics can be stored at a step 120 in a database and retrieved at a step 130 from the database for further processing. At a step 140, an average and a rate of change are calculated using utilization statistics. A date of exhaustion for a communications link is forecasted based on the calculated average and the calculated rate of change at a step 150.

In an embodiment, a method is provided for replacing a faulty communications link. A communications link can be a communications channel for transmitting data between two endpoints. In such an embodiment, the method provides multiple steps for accurately determining whether a communications link is faulty. These steps include, but are not limited to, referencing one or more communications links for utilization statistics over a period of time; storing utilization statistics of the communications links in a database; retrieving utilization statistics of the communications links from the database; calculating an average and a rate of change of the utilization statistics using a trimmed set of data; and calculating a date of exhaustion for the communications link using the calculated average and the calculated rate of change. This embodiment further allows a user to ensure data is flowing at an operable bandwidth in a communications network. For example, a communications link that is performing poorly can be detected early based on its utilization statistics and replaced before the communications link completely fails.

In another embodiment, the method can provide a multiple of utilization statistics. In such an embodiment, the utilization statistics can include traffic congestion statistics. The traffic congestion statistics can contain data corresponding to the heaviest amount of data flowing during a period of a day. Additionally, the utilization statistics can include exhaust condition statistics, performance statistics, expected life span statistics, bandwidth capacity statistics, etc.

In such an embodiment, communications links are referenced for utilization statistics over a period time. The communications link is preferably a data trunk. During the referencing stage for utilization statistics, the rate of data flow, which is measured in Bits per sec, is sampled multiple times a day. The sampling of the rate of data flow can be 2 times a day, 3 times a day, 4 times a day, or as many times a day it takes to get an accurate reading of the data flow through a communications link. Alternatively, the sampling of the rate of data flow can take place at the highest point of data traffic in a day.

After the utilization statistics have been referenced, the utilization statistics are stored in a database. In one embodiment, the database includes a Central Database Collection (CDC). The database can be any storage device capable of storing data. During the storage stage, the database maintains and sorts the utilization statistics into an inventory list of data such as internal and external customer port assignments.

Once the utilization statistics are sorted and listed, the utilization statistics can be retrieved and processed for future calculations. The utilization statistics can be used to calculate an average and a rate of change using a trimmed set of data. In one embodiment, the rate of change is calculated using a form of regression analysis. The form of linear regression includes a linear regression. Alternatively, other mathematical computations may be used on data points to calculate the rate of change. In another embodiment, the trimmed set of data can be compiled by discarding a portion of values of the utilization statistics. The portion of values includes a first set of data collections that fall below a portion of floor values and/or second set of assistive-technology application collections that exceed ceiling threshold of the utilization statistics. For example, the portion of values can be computed using the low and high tenth percentile (10%) values of the peak values of the utilization statistics.

Upon calculation of the average and rate of change, a date of exhaustion for the communications links can be calculated. In such an embodiment, a faulty communications link can be replaced before the communications link completely fails. Thus, avoiding a communications network from being offline or data flow from being interrupted for substantial periods of time.

Figure 2:
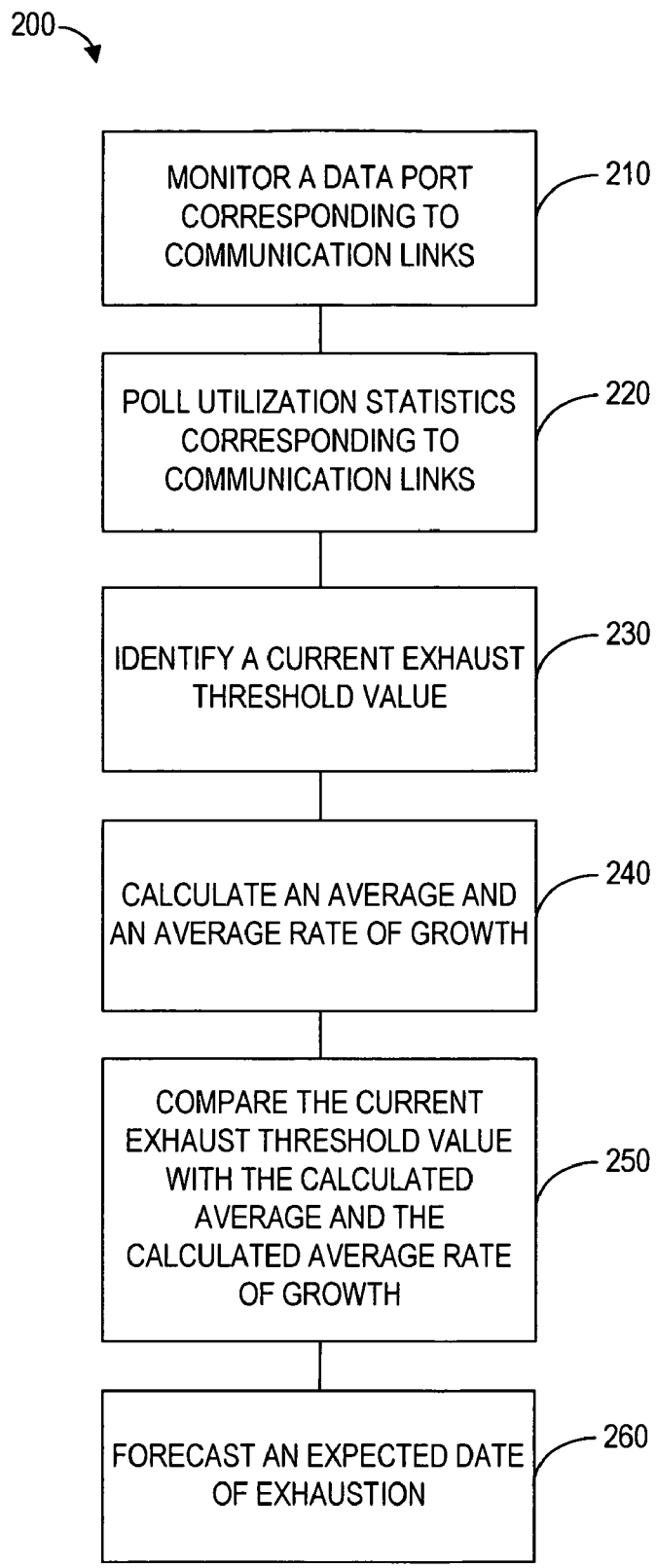
FIG. 2 is a flowchart illustrating an second overview of a method in accordance with an embodiment of the invention.

FIG. 2 provides an example of a method for forecasting a date of exhaustion for a communications link 200. In FIG. 2, a set of computer-usable instructions monitors data ports at a step 210 and polls communications links for utilization statistics at a step 220. At a step 230, a current exhaust threshold value is identified for evaluating the exhaust condition for a communications link. At a step 240, an average and an average rate of change are calculated using utilization statistics. At a step 250, the calculated average and the calculated average rate of change are compared with the current exhaust threshold value for determining the status of a communications link. At a step 260, a date of exhaustion for a communications link is forecasted based on the comparison results.

In another embodiment, a method is provided for forecasting a date of exhaustion for a communications link. The date of exhaustion can be the date on which a communications link reaches a utilization exhaust value and as a result completely fails in performance. For example, a communications link has a current utilization exhaust value of 65% on a specific day. The performance of the communications link for allowing data flow might be medium, or even poor. However, the communications link is still functional. If the current utilization exhaust value exceeds the utilization exhaust threshold value, for example, 70%, then the communications link has reached a critical threshold with potential for latency or degraded data services and requires replacement.

In such an embodiment, the method provides multiple steps for accurately forecasting the date of exhaustion for a communications link. These steps can include, but are not limited to, monitoring a data port corresponding to one or more communications links over a period of time; polling the communications links to determine utilization statistics related to traffic flow through the communications link; identifying a current exhaust threshold value of the communications links; calculating an average and an average rate of growth using the utilization statistics; comparing the current exhaust threshold value of the communications links with the calculated average and the calculated average rate of growth; and forecasting an expected date of exhaustion for the communications links using the comparison results of the exhaust threshold value, the calculated average, and the calculated average rate of growth.

In an embodiment, a data port can be monitored for a predetermined period of time. The data port can correspond to one or more communications links. The communications links can be data trunks. The monitoring step can further comprise observing the daily flow of data received and transmitted to the port. The observation of data flow can be for at least a week, at least a month, or any period of time to determine an accurate reading. For example, if the data flow was low for 2 months due to unexpected factors, a 3 month interval may be necessary to determine an accurate reading of the typical data flow at the data port.

Thereafter, communications links can be polled at a specified time interval to determine utilization statistics. The utilization statistics can include traffic congestion statistics, exhaust condition statistics, performance statistics, expected life span statistics, bandwidth capacity statistics, etc. The specified time interval for referencing utilization statistics can vary greatly. Typically, the specified time interval for referencing can be set at the heaviest periods of data flow for a data port. For example, if 12:00 p.m. is a peak time for data flow, the communications links can be polled for determining an accurate reading of the data flow.

After the utilization statistics are polled, a current exhaust threshold value is calculated for a communications link. The current exhaust threshold value represents the utilization performance rate for a communications link. Put another way, the percentage at which a communications link is operating before the communications link fails or is exhausted. Utilization performance rates can vary for different types of communications links. For example, a communications link may be performing at a utilization performance rate of 50%. When this communications link exceeds a utilization performance rate, or exhaust threshold value, of 70%, the communication has reached a critical threshold with potential for latency or degraded data services and requires replacement. Therefore, identifying the current exhaust value of a communications link is of great importance to ensure proper data flow. In alternate embodiment, a warning can be sent to a user to replace a communications link, if the current exhaust value exceeds a predetermined exhaust threshold value. The predetermined exhaust threshold value can be 50%, 60%, 70%, 80%, 90% or any value that determines whether a communications link has been exhausted or has the potential to submit data services to latency or degradation.

In such an embodiment, an average and an average rate of growth can be calculated using the utilization statistics coupled with a trimmed set of raw data. In one embodiment, the average rate of change can be calculated using a form of regression analysis. Alternatively, other mathematical computations may be used on data points to calculate the average rate of change. Similarly, as in other embodiments, the trimmed set of raw data can be computed using the low and high tenth percentile (10%) values of the peak values of the utilization statistics.

After calculating the average and the average rate of growth, these values can be compared with the current exhaust threshold value for a communications link. In one embodiment, a greater value can be determined between the current exhaust threshold value and the calculated average corresponding to the calculated average rate of growth at a specified point in time. In such an embodiment, the greater value can be judged, or compared, against a predetermined exhaust threshold value. If the greater value exceeds a predetermined exhaust threshold value, a warning can be sent to a user to replace the communications link. For example, if the greater value is 60%, and the predetermined exhaust threshold value is 59%, a warning signal can be sent to a user to replace the communications link.

From the comparison results, the expected date of the exhaustion for a communications link can be forecasted. In one embodiment, the number of days remaining until a communications link is exhausted can be calculated by computing the number of days it takes for the calculated average corresponding the calculated average rate of growth to exceed a predetermined exhaust threshold value. For example, if the calculated average is 50% on day 1, the calculated average rate of growth 2% a day, and the predetermined exhaust threshold value is 60%, there would be about 6 days before the communications link would reach an exhaustion or critical condition. As a result, a communications link technician could take all the necessary precautions to replace the communications link in a timely manner. Alternatively, there are many other mathematical computations for forecasting the expected date of exhaustion for a communications link.

Figure 3A:
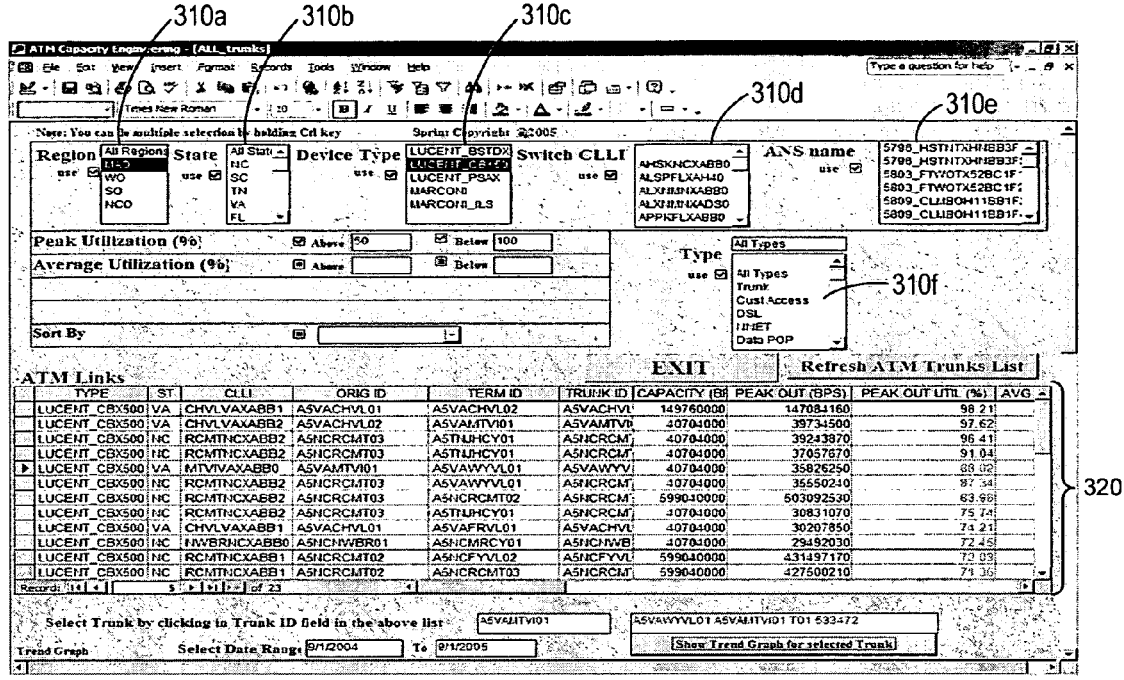
FIGS. 3A and 3B are exemplary screenshots illustrating an overview of a graphical user interface in accordance with an embodiment of the invention.
Figure 3B:
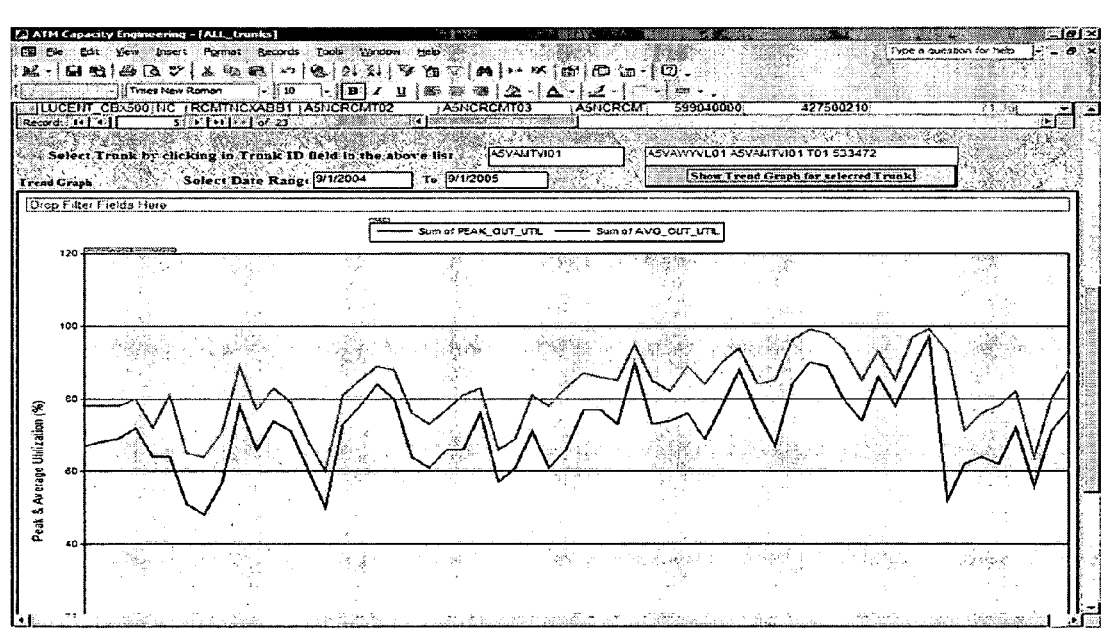

FIG.(S) 3A and 3B provides an example of an embodiment, as a screenshot, of the graphical user interface. In FIG. 3A, a set of one or more selectable menu items 310a-310f are shown that represent various characteristics of communications links. FIG. 3A also shows a communications link listing grid 320. The communications link listing grid 320 has a multiple of communications links listed and capable of being sorted by a multiple of parameter values to monitor the status and forecast the exhaust date of the communications links. In FIG. 3B, a graph tool 330 that plots the utilization statistics is shown. The graph tool 330 enables a user using the data points to monitor the status of the communications links and forecast the exhaust date of the communications links.

In an embodiment, a graphical user interface (GUI) is provided for displaying the status of a communications link. The user interface provides a user the ability to select, monitor, and navigate through multiple communications links. The user interface provides multiple components for enhancing a user's ability to check the status of a communications link. The components can include, but are not limited to, one or more selectable menu items corresponding to characteristics of one or more communications links; a graph tool showing the utilization statistics for monitoring the status of the communications links and forecasting the exhaust date of the communications links; and a communications link listing grid having communications links sortable by a multiple of parameter values for monitoring the status and forecasting the exhaust date of the communications links.

In this embodiment, the selectable menu items can correspond to one or more characteristics of a communications link. A few examples of characteristics for communications links are Region, State, Device Type, Switch CLLI, ANS name, and Trunk Type. Alternatively, other groups of characteristics may be used as menu items for effectively checking the status of the communications links.

The graph tool for showing the utilization statistics can be any software program capable of plotting data points. The graph tool can process the data provided from the polled utilization statistics and plot multiple X-Y graphs for performing a trending analysis of the data. In one embodiment, the X-axis shows a time line measured in days. The Y-axis, on the other hand, shows Peak & Average Utilization values measured in percentages that correspond to values on the X-axis. Alternatively, the X-axis & Y-axis can vary and graph all types of characteristics corresponding to the communications links over various periods of time. For example, the utilization statistics can be peak and average utilization threshold values.

The communications link listing grid has an interface and formatting operations similar to a data spreadsheet software program. In an embodiment, the communications link listing grid can sort, shuffle, and operate on various cells of data corresponding to a multiple of parameter values. The parameter values can include orig. ID, term ID, bandwidth capacity, peak out value, peak out utilization, average out value, and average out utilization. Alternatively, additional parameter values can be added for monitoring the status and forecasting the expected date of exhaustion a communications link.

In one embodiment, the present invention provides a mathematical algorithm for describing the trending calculations using a spreadsheet program. Pseudocode for an illustrative algorithm follows in Table 1.

TABLE 1

Exemplary pseudocode for
IExtensibilityApplications::LaunchUrl n is # of historical data samples
Select n
Un    = {U1, U2. Un} ;Bandwidth Utilization data set
X     = TrimmedAverage (Un, + 15%) ; Exclude peaks and valleys from
        data sets + 15%
S     = Slope (Un) ; rate of Bandwidth utilization change along the
        regression line
Let Ut represent the threshold to calculate when Link Utilization will reach
D_exhaust = (Ut − X ) / S ; exhaust date which mean when threshold
        will be reached
Save D_exhaust to internal database;
End:
Function Definitions:
Slope: Returns the slope of the linear regression line through data points.
    The slope is the vertical distance divided by the horizontal
    distance between any two points on the line, which is the rate of
    change along the regression line.
TrimmedAverage: Returns the average of the interior of a data set by
    excluding a percentage of data points from the top and bottom
    tails of a data set.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more computer-readable media, having computer-usable instructions embodied thereon for performing a method for replacing a faulty communications link, the method comprising:
    referencing one or more communications links to determine utilization statistics of the links associated with a period of time;
    calculating an average and a rate of change of the utilization statistics using a trimmed set of data; and
    calculating an anticipated date that the communications link will reach a certain capacity threshold using the calculated average and the calculated rate of change.

2. The computer-readable media of claim 1, wherein the utilization statistics include traffic congestion statistics.

3. The computer-readable media of claim 1, wherein the trimmed set of data is compiled by discarding a portion of values, the portion of values includes a first set of data collections that fall below a floor values and/or a second set of assistive-technology application collections that exceed a ceiling threshold of the utilization statistics.

4. The computer-readable media of claim 1, wherein the communications link includes a data trunk.

5. The computer-readable media of claim 1, wherein the rate of change is calculated using a form of regression analysis.

6. The computer-readable media of claim 1, wherein referencing the communications links further comprises: sampling a rate of data flow through a communications link during the period of time.

7. The computer-readable media of claim 1, wherein referencing the communications links further comprises: sampling the rate of data flow at least 2 times a day.

8. The computer-readable media of claim 1, wherein referencing the communications links further comprises: sampling the rate of data flow during the highest point of data traffic in a day.

9. One or more computer-readable media, having computer-usable instructions embodied thereon for performing a method for forecasting a date of exhaustion for a communications link, the method comprising:
- monitoring a data port corresponding to one or more communications links over a period of time;
- polling the communications links to determine utilization statistics related to traffic flow through the communications link; and
- forecasting an expected date of exhaustion for the communications links.

10. The computer-readable media of claim 9, further comprising: identifying a current exhaust threshold value of the communications links.

11. The computer-readable media of claim 10, wherein identifying the current exhaust threshold value further comprises: warning a user to replace a communications link, if the current exhaust threshold value exceeds a predetermined exhaust threshold value.

12. The computer-readable media of claim 11, wherein the predetermined exhaust threshold value is about 70%.

13. The computer-readable media of claim 9, further comprising: calculating an average using the utilization statistics.

14. The computer-readable media of claim 13, further comprising calculating an average rate of growth using the utilization statistics.

15. The computer-readable media of claim 14, further comprising: comparing the current exhaust threshold value of the communications links with the calculated average and the calculated average rate of growth.

16. The computer-readable media of claim 15, wherein comparing the current exhaust threshold value with the calculated average and calculated average rate of growth further comprises: determining a greater value of the current exhaust threshold value and the calculated average corresponding to the calculated average rate of growth at a specific point in time.

17. The computer-readable media of claim 16, wherein the greater value is judged against a predetermined exhaust threshold value and warning a user to replace a communications link, if the greater value exceeds a predetermined exhaust threshold value.

18. The computer-readable media of claim 9, wherein monitoring the data port further comprises: observing a daily flow of data through the port.

19. The computer-readable media of claim 9, wherein the utilization statistics include traffic-congestion statistics.

20. The computer-readable media of claim 9, wherein forecasting the expected date of exhaustion further comprises: calculating the number days of remaining until the calculated average exceeds a predetermined exhaust threshold value based on the calculated average rate of growth corresponding to the calculated average such that the day on which the calculated average exceeds the predetermined exhaust threshold value is the expected date of exhaustion for the communications links.

* * * * *